United States Patent [19]
Royer

[11] Patent Number: 4,862,581
[45] Date of Patent: Sep. 5, 1989

[54] METHOD OF CONSTRUCTING A DYNAMOELECTRIC MACHINE

[75] Inventor: Neal B. Royer, St. Louis, Mo.

[73] Assignee: Emerson Electric Co., St. Louis, Mo.

[21] Appl. No.: 148,074

[22] Filed: Apr. 4, 1988

Related U.S. Application Data

[60] Continuation of Ser. No. 427,647, Sep. 29, 1982, abandoned, which is a division of Ser. No. 368,397, Apr. 14, 1982, Pat. No. 4,438,359.

[51] Int. Cl.$^4$ .............................................. H02K 15/14
[52] U.S. Cl. ........................................ 29/596; 29/597; 310/71; 310/73; 310/90; 310/157; 416/5
[58] Field of Search .................... 29/596, 597; 310/73, 310/79, 90, 68 R, 71, 157; 362/96; 416/5

[56] References Cited
U.S. PATENT DOCUMENTS

| | | | |
|---|---|---|---|
| Re. 11,787 | 11/1899 | Meston | 310/157 |
| 2,201,153 | 5/1940 | Brown | 362/96 X |
| 2,596,783 | 5/1952 | Moore | 310/157 |
| 3,052,958 | 9/1962 | Anderson | 29/598 |

Primary Examiner—Carl E. Hall
Attorney, Agent, or Firm—Polster, Polster and Lucchesi

[57] ABSTRACT

A dynamoelectric machine, preferably a motor adapted for use in ceiling fan applications, has a conventional rotor assembly mounted within a bore of a stator assembly. A stationary shaft extends through the rotor assembly and provides both a cableway for electrically connecting the motor to a source of electrical energy and for permitting the attachment of additional apparatus on one end of the stationary shaft. A retainer is mounted on the stationary shaft and positions the rotor assembly with respect to the stator. The rotor assembly is attached to a hub which rotates with the rotor and provides means for attaching blades to the motor. The stator is press fit into an end shield and the resulting structure is a compact, light weight, efficient dynamoelectric machine. The end shield is provided with means for attaching a decorative enclosure about the motor, so that the asthetic appearance of the motor can be enhanced substantially. The resulting structure is relatively low weight and enables a user to install the motor, and in particular, ceiling fans more easily than prior art devices.

5 Claims, 2 Drawing Sheets

METHOD OF CONSTRUCTING A DYNAMOELECTRIC MACHINE

BACKGROUND OF THE INVENTION

This invention relates to dynamoelectric machines and in particular to AC induction motors. While the invention is described with particular emphasis on the use of the motor of this invention in ceiling fan applications, those skilled in the art will recognize the wider applicability of the inventive concepts disclosed hereinafter.

Ceiling fans, alone or in combination with other electrical devices, for example, lights, light fixtures, or luminaires have recently again become exceedingly popular. Most ceiling fan technology dates from the turn of the century, when such fans were used extensively. The prior demise of the ceiling fan was coincident with the rise of the use of refrigerated air conditioning systems in the 1940's and 50's. The relatively recent acceleration in energy costs, however, has caused the consumer to look for alternate ways to "condition" air. In particular, it has been found that a ceiling fan can be used during the heating season to return hot air from the ceilings of relative high ceiling rooms toward the floor, providing an air pattern which maintains a more constant temperature gradient in such rooms at a lower thermostat setting, with lower overall operating cost. Likewise, such air circulation during the cooling season permits a higher thermostat setting. Again, the improved temperature gradient from floor to ceiling reduces overall energy consumption resulting in lower operating costs. Consequently, the ceiling fan has regained its popularity for a range of applications, from factories to resort condominiums.

Historically, ceiling fan motors have been of two general types. The first, known in the art as an inside/out motor, positioned the rotor externally of the stator and permitted direct attachment of the fan blades to the rotor. Since the stator assembly was positioned internally of the rotor, a stationary shaft was inserted through the stator core. The stationary shaft made the attachment of additional electrical components easy to accomplish. Unfortunately, inside/out motors are relatively expensive to produce. They also weigh relatively large amounts in comparison to more conventional motor designs. Consequently, their installation is complicated and cannot easily be accomplished by a single individual.

More conventional stator/rotor motor designs also have been employed in ceiling fan applications. Conventional motors do not lend themselves to ceiling fan applications as readily as inside/out motors in that they do not provide an easy way to attach additional devices to the ceiling fan. In particular, the addition of a light or a lighting fixture to the ceiling fan structure is difficult to accomplish with conventional stator/rotor designs because the rotor for the motor is located in the central bore of the stator assembly, and rotates during motor operation. I am aware of motor designs of the conventional stator/rotor type in which a large sleeve bearing has been used in conjunction with a second stationary shaft. The stationary shaft facilitates attachment of the above-mentioned luminaires or other electrical devices. However, the design and construction of such prior art motors have produced products having severe weight handicaps. For example, one prior art design with which I am familiar requires additional support for the ceiling fan if the fan is to be installed in a home. That is to say, the fan cannot be hung from a conventional ceiling electrical box. Rather, additional braces are required along the ceiling rafters for safety purposes. Because of its weight, installation of such prior art ceiling fans by a single individual is nearly impossible.

The invention disclosed hereinafter overcomes these prior art deficiencies by providing a single motor structure which can be used over a broad range of ceiling fan designs and applications. In its industrial form, it may be used without a decorative enclosure and provides a very light, easy to install product. In cases where asthetic appearance is important, the design enables the insertion of the motor in a decorative enclosure, so that the motor per se is hidden. Even with such an enclosure, however, the fan is light weight and can be installed in a conventional manner without use of additional supports or braces. Installation by a single individual is not only possible but practical. The motor includes a stationary center shaft which is used both for the attachment of additional components, and to provide a cableway for connection of those devices to a source of electrical energy.

One of the objects of this invention is to provide an improved motor design for ceiling fan applications.

Another object of this inention is to provide a relatively light weight motor design.

Another object of this invention is to provide a motor design adapted for ceiling fan applications which includes a stationary center shaft.

Another object of this invention is to provide a motor for ceiling applications which can be used on a broad range of those applications, including industrial and residential uses.

Another object of this invention is to provide a simplified motor construction method of assembly.

Still another object of this invention is to provide a simplified motor design which can be placed in an asthetically appealing enclosure simply and economically.

Other objects of this invention will be apparent to those skilled in the art in light of the following description and accompanying drawings.

SUMMARY OF THE INVENTION

In accordance with this invention, generally stated, a dynamoelectric machine, and in particular, a motor design adaptable to ceiling fan applications is provided, the preferred embodiment of which includes a motor having a stationary center shaft mounted in the bore of a stator assembly. A rotor assembly is mounted on a hub which is rotatable with it. The hub also is rotatable with respect to the stationary center shaft. The hub has connection devices associated with it for mounting a plurality of fan blades to the hub. The motor is constructed so that the various motor elements depend from a single end shield which in turn can be attached to a conventional pipe extension or the like for mounting the ceiling fan in a particular application. A method for constructing a motor is disclosed which employs a single end shield for attaching the motor elements. The end shield also has a connection system associated with it for permitting the insertion of the motor in a decorative enclosure.

DESCRIPTION OF THE PREFERRED EMBODIMENT

Figure 1:
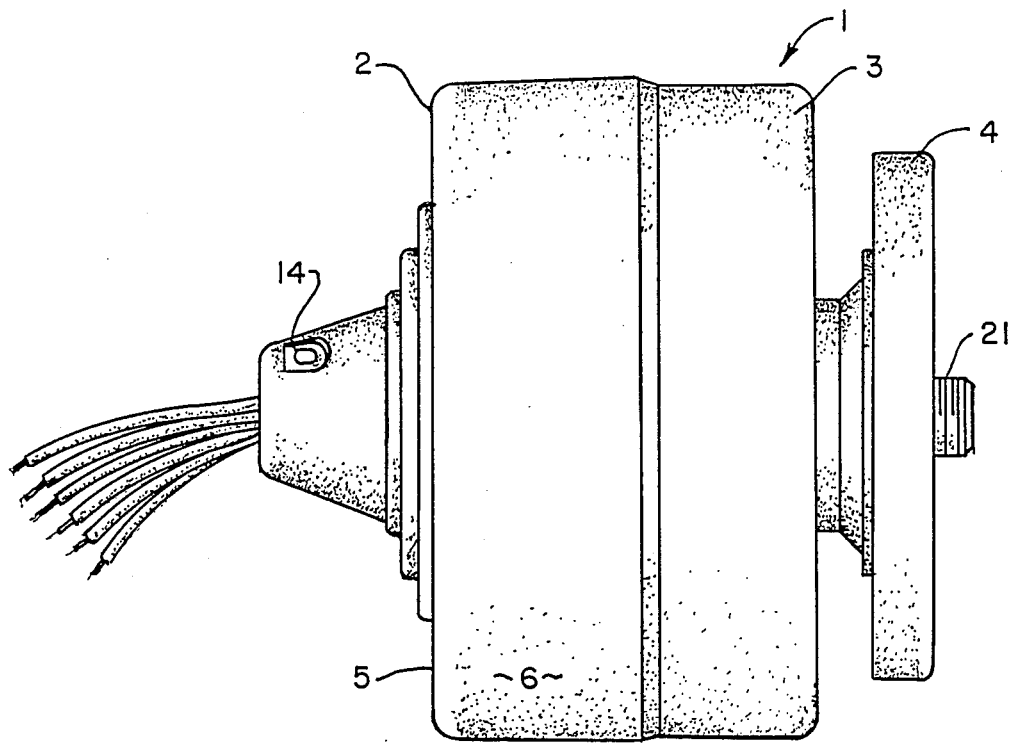
FIG. 1 is a view in side elevation of one illustrative embodiment of dynamoelectric machine of this invention.

Referring now to FIG. 1, reference numeral 1 indicates one illustrative embodiment of motor of this invention. The motor 1 includes a single end shield 2, an end turn cover enclosure 3, and a hub structure 4.

Figure 2:
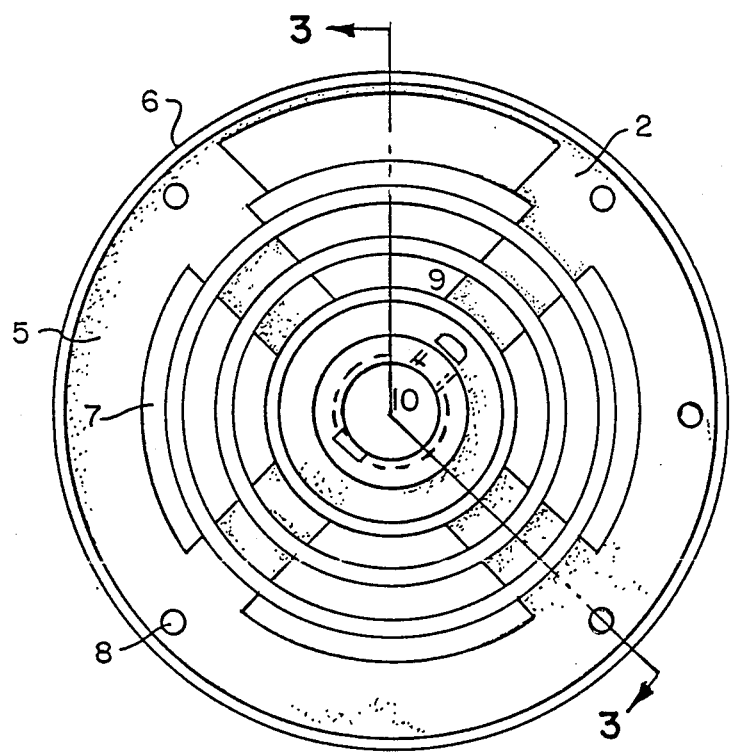
FIG. 2 is a top plan view thereof.
Figure 3:
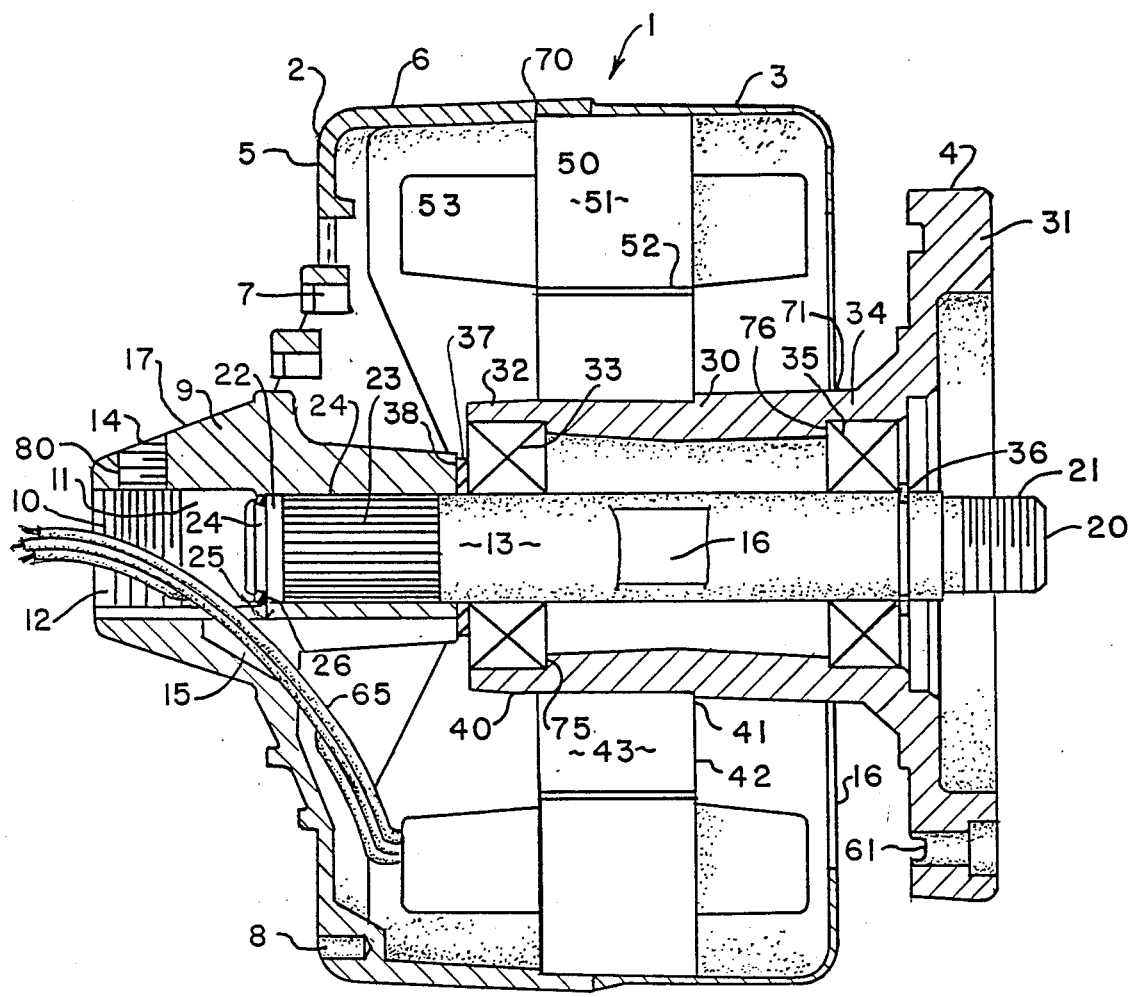
FIG. 3 is a sectional view taken along the line 3—3 of FIG. 2.

The end shield 2 is defined by an upper surface or top wall 5 and an integrally formed, dependent side wall 6. The top 5 has a plurality of openings 7 formed in it, best seen in Figure 2, which serve as ventilation means for the motor 1. The top 5 also has a plurality of mounting means 8 formed in it, for purposes later described in greater detail. The end shield 2 has an attachment means 9 integrally formed with the top 5. In the preferred embodiment, the attachment means 9 is located centrally with respect to the top 5. The attachment means 9 in turn defines a central passage 10 which extends axially through the attachment means, the passage 10 being delimited by an internal wall 11. As shown in FIG. 3, the wall 11 has a series of threads 12 formed in it along one end of the passage 10, while a second end of the passage 10 is adapted to receive a stationary shaft 13. The threads 12 are used to mount the motor 1 to a conventional pipe mounting (not shown) in ceiling fan applications which employ the motor 1. An external wall 17 of the attachment means 9 has a radial opening 14 in it which communicates with the passage 10. The opening 14 has an internally threaded wall 80 sized to receive any one of a number of conventional set screws, not shown, the set screw being used to provide an additional lock arrangement between the attachment means 9 and any associated pipe mounting. Attachment means 9 also has a raceway 15 formed in it, which is best seen in Figure 3. The purpose of raceway 15 is described in greater detail hereinafter.

The shaft 13 has an axial opening 16 extending through it. The opening 16 is important in that it permits easy, unobstructed passage of electrical conductors from the threaded end of the attachment means 9 to an end 20 of the shaft 13. The end 20 of the shaft 13 in turn is threaded along a portion of an external surface 21. The threads of the surface 21 are used to mount a lighting fixture or a decorative end cap, for example, to the motor 1 in various embodiments of this invention. Neither is shown in the drawings. The shaft 13 also has an end 22 having a plurality of knurls 23 formed in the external surface 21. The knurls 23 are sized so that they are slightly larger than the internal diameter of the passage 10 in the attachment means 9. During motor 1 construction, the shaft 13 is pressed within the passage 10 in a tight, interference fit. The end 22 of shaft 13 also has a groove 24 formed in it, which is sized to receive a retaining ring 25. The retaining ring 25 abuts an internal shoulder 26 formed along the passage 10 and the engagement of the retaining ring 25 and the shoulder 26 provides additional support for the shaft 13.

The hub 4 includes an elongated portion 30 and an integrally formed base 31. The elongated portion 30 is cylindrical in section, as is best seen in FIG. 3. A first end 32 of the portion 30 is sized to house a bearing 33, while an end 34 of the portion 30 likewise houses a bearing 35. The bearings 33 and 35 are mounted on the shaft 13 to permit relative rotation of the hub 4 with respect to the shaft 13. As indicated above, my design enables the shaft 13 to remain stationary. The shaft 13 also has a retainer 36 mounted to it adjacent the bearing 35. The retainer 36 functions to maintain the position of the bearings 33 and 35 constant with respect to the shaft 13. A spring washer 37 is mounted between an end 38 of the attachment means 9 and the bearing 33. Spring washer 37 provides a preload on the bearings 33 and 35.

An external wall 40 of the elongated section 30 defines a shoulder 41 which supports an end face 42 of a rotor assembly 43. Rotor assembly 43 is mounted to the elongate portion 30 of the hub 4 in a shrink fit so that the hub and rotor, after their interconnection, may be considered, for the purposes of this specification, as an integral part. Rotor 43 is conventional in that it may be of a squirrel cage design, the rotor comprising a plurality of laminations formed from suitable magnetic material. The laminations have a plurality of slots formed in them, and conductive material, preferably aluminum, is cast to provide the rotor bars of the squirrel cage design. The bars are shorted at each end of the lamination plurality by suitable rotor end rings.

A stator assembly 50 includes a core 51 constructed from a plurality of individual laminations. The core 51 conventionally has a central bore opening 52 sized to receive the rotor assembly 43. The core 51 has a plurality of radially extending slots, not shown, which receive turns of magnet wire predeterminedly wound to form a motor winding 53. The motor winding 53 per se and its location within the slots of the core 51 form no part of this invention. Neither is described in detail. A number of winding methods and techniques are known in the art for constructing and inserting the winding 53 in the core 51.

Side wall 6 of the end shield 2 defines an annular shoulder 70 along the radially inward side of the end shield, which receives an outer surface of the core 51 in a press fit.

The end turn cover 3 also is of a cup shaped design and is press fit over the outer surface of the core 51 in a conventional manner. It is important to note that the cover 3 is just that. It performs no structural function in the embodiment shown in the drawings. Conceivably, it can be eliminated without affecting motor 1 operation. In any event, it is a relatively low cost part in comparison to prior art end shields, which conventionally house structural components required for motor operation.

The base 31 of the hub 4 has a plurality of bolt openings 61 formed in it. The openings 61 are designed to permit attachment of fan blades, not shown, to the hub 4. Attachment may be accomplished by a variety of methods. Conventional threaded fasteners work well, for example.

Figure 4:
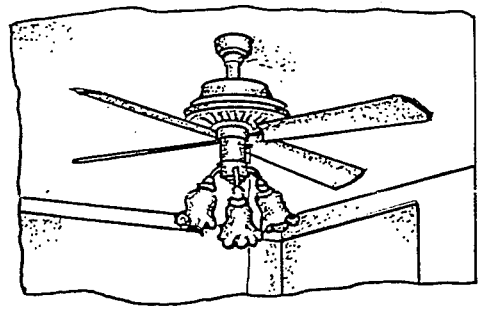
FIG. 4 is a view in perspective of the motor of FIG. 1 inserted in a decorative enclosure.

In its various configurations, the motor 1 may be used as is, merely by attaching fan blades along the hub 4, and mounting the motor to a suitable drop pipe, not shown, in a conventional manner. Alternatively, a decorative enclosure may be mounted about the motor 1 and attached along the mounting means 8. An illustrative example of such an arrangement is shown in FIG. 4. Connection of the enclosure and motor 1 again may be accomplished in a variety of ways, and threaded fasteners work well, for example.

As thus described, an exceedingly simple and relatively low cost motor design is disclosed which can used in a variety of situations. As is apparent from the description set forth above, the entire motor is dependent from and attached to a single end shield 2. In constructing the motor 1, conventionally the end shield 2 is an aluminum casting, which is turned along the shoulder 70, the shoulder 26 and the passage 10. The hub 4 also preferably is an aluminum casting, which is turned along a shoulder 75 and a shoulder 76 to permit reception of the bearings 33 and 35, as later described in greater detail. Finally, the shoulder 41 also is machined prior to intermounting of the rotor assembly 43 and the hub 4. Some machining also may be required along the opening 61 to permit easy attachment of the fan blades described above.

Various construction sequences may be employed in constructing the motor 1. Preferably, the shaft 13 is press fit within the passage 10 of the end shield 3. Thereafter, the shoulder 70 is machined in the end shield 2 so that it is square with respect to the shaft 13. The stator assembly 50 then is pressed into position along the shoulder 70 of the end shield 2. Either after or during the manufacturing processes being conducted on the stator assembly 50 and the end shield 2, the various machining operations are performed on the hub 4. That is to say, the hub 4 is machined so that the bearing assemblies 33 and 35, and the rotor assembly 43 may be positioned properly with respect to the hub 4. After machining, the rotor assembly is press fit on the hub. The spring washer 37 and combined hub 4 and rotor assembly 43 then are slipped over the shaft 13 and locked in position by the placement of retainer 36. Although the preferred method of construction has just been described, those skilled in the art will recognize that other assembly methods may be employed. For example, rather than utilizing a press fit between the stator core and the end shield 2, adhesive may be employed along the periphery of the stator core between the stator core and the end shield. When adhesive is used, shims are employed in the air gap of the motor in order to ensure a proper air gap for operation of the motor. Once the stator assembly 50 and the shaft 13 are positioned properly, and the adhesive is cured, the shims are removed.

During construction of the stator assembly 50, motor leads 65 are attached to the windings 53 and those leads are drawn through the raceway 15 and brought out the opening 10. Because of the design of the motor 1, the lead withdrawal can be accomplished easily. When additional structure is to be attached to the end 20 of the shaft 13, leads for electrically connecting that additional structure can be worked through the opening 16 in the shaft 13 without difficulty. Either before or after placement of the hub 4/shaft 13 combination, the end wire cover 3 is press fit over the stator assembly 50. As is best observed in FIG. 3, the end wire cover 3 has an opening 71 which permits unimpeded passage of at least the elongated portion 30 of the hub 4.

Numerous variations, within the scope of the appended claims, will be apparent to those skilled in the art in light of the foregoing description and accompanying drawings. Thus, the motor design and in particular the winding configuration may be altered in embodiments of this invention. Likewise, the design silhouette of the end shield 5, the end wire cover 3, or the hub 4 may be altered, for example. Locations of various parts may be changed without departing from the spirit of the invention disclosed herein. Although a preferred series of steps in the motor construction is described above, those steps may be varied or performed in altered sequence, if desired. These variations are merely illustrative.

Having thus described the invention, what is claimed and desired to be secured by Letters Patent is:

1. A method of constructing a dynamoelectric machine, comprising:
   forming an end shield having an axial opening in it, said end shield having at least one side wall;
   forming a hollow bore shaft with predetermined external and internal diameters and a first end and a second end, mounting said hollow bore shaft along the first end thereof in the axial opening of said end shield so as to retain said shaft in said opening, the second end of said shaft including means for mounting at least one additional device to said shaft, said hollow bore permitting electrification of said additional device;
   machining a portion of said side wall of said end shield after mounting said shaft in said end shield to provide squareness of said machined portion with respect to said shaft;
   press fitting a stator assembly for said dynamoelectric machine into said end shield along the machined portion thereof, so as to ensure squareness of said stator assembly with respect to said shaft, said stator assembly having a central bore opening in it;
   forming a non-lubricated hub having an axial length and an axial opening through it, said hub having an external diameter and an internal diameter, the internal diameter of said hub along its axial opening being formed sufficiently larger than the predetermined external diameter of said shaft to define a predetermined space therebetween;
   mounting at least one bearing along a portion of the axial opening of said hub in the predetermined space between the hub and shaft;
   mounting a rotor for said dynamoelectric machine on said hub along the external diameter of said hub to form a rotor and hub combination; and
   mounting the rotor and hub combination on said shaft so that said rotor and hub combination are supported on said shaft and rotatable with respect thereto along said bearing, said rotor and said shaft being positioned along the bore opening of said stator assembly; and
   attaching a decorative enclosure to said end shield.

2. A method of constructing a dynamoelectric machine so as to permit the components of the dynamoelectric machine to be suspended from a single end shield to facilitate mounting the dynamoelectric machine to a ceiling or the like, comprising the steps of:
   forming an end shield having an axial opening in it, said end shield having at least one side wall;
   mounting a hollow bore shaft in the axial opening of said end shield in a stationary position, said hollow bore shaft being fixed in the opening of said end shield;
   machining a portion of the side wall of said end shield after mounting said shaft in said end shield to ensure squareness of said side wall with respect to said shaft;
   press fitting a stator assembly for said dynamoelectric machine into said end shield along the machined portion thereof so that said stator assembly is supported by said end shield and square with respect to said shaft, said stator assembly having a central bore opening formed in it, said bore opening passing said shaft;

forming a non-lubricated hub having an axial length and an axial opening through it, said hub having an external diameter and an internal diameter, the internal diameter of said hub along its axial opening being formed sufficiently larger than the predetermined external diameter of said shaft to define a predetermined space therebetween;

mounting at least one bearing along a portion of the axial opening of said hub in the predetermined space between the hub and shaft;

mounting a rotor for said dynamoelectric machine on said hub along the external diameter of said hub to form a rotor and hub combination; and mounting the rotor and hub combination on said shaft so that said rotor and hub combination is supported by said shaft and rotatable with respect to it along said bearing.

3. The method of claim 1 wherein said end shield has a raceway formed in it, said raceway communicating with the axial opening in said end shield, including the step of drawing wire through said raceway.

4. The method of claim 3 wherein said shaft has a threaded end, including the step of attaching another device to said shaft.

5. The method of claim 4 further including the step of connecting said second device to a source of electrical energy through said shaft.

* * * * *

UNITED STATES PATENT AND TRADEMARK OFFICE
CERTIFICATE OF CORRECTION

PATENT NO. : 4,862,581

DATED : September 5, 1989

INVENTOR(S) : Neal B. Royer

It is certified that error appears in the above-identified patent and that said Letters Patent is hereby corrected as shown below:

Column 3, line 45, after "has," insert -- a predetermined external diameter with --;

Column 3, Line 45, after "16", insert -- of predetermined internal diameter --;

Column 3, line 66, after "30" insert -- , having an external and internal diameter,--

Column 4, line 4, after "13", insert -- in a predetermined space between the hub 4 and shaft 13 --.

Signed and Sealed this

Twenty-seventh Day of November, 1990

Attest:

HARRY F. MANBECK, JR.

*Attesting Officer*      *Commissioner of Patents and Trademarks*